(12) United States Patent
Zummack

(10) Patent No.: US 6,871,894 B2
(45) Date of Patent: Mar. 29, 2005

(54) AUTOMOBILE SAFETY ACCESSORY, ESPECIALLY A SEPARATING NET

(75) Inventor: Wolfram Zummack, Troisdorf (DE)

(73) Assignee: BOS GmbH & Co. KG, Ostfildern (DE)

(*) Notice: Subject to any disclaimer, the term of this patent is extended or adjusted under 35 U.S.C. 154(b) by 0 days.

(21) Appl. No.: 10/661,359

(22) Filed: Sep. 12, 2003

(65) Prior Publication Data
US 2004/0130171 A1 Jul. 8, 2004

(30) Foreign Application Priority Data
Sep. 12, 2002 (DE) .......................................... 102 42 510

(51) Int. Cl.⁷ .................................................. B60N 3/00
(52) U.S. Cl. ................. 296/24.4; 296/24.43; 296/37.16
(58) Field of Search ........................ 296/24.4, 24.43, 296/24.46, 191, 37.16, 1.04, 98; 160/238, 23.1, 306, 299; 293/128; 403/117; 280/749

(56) References Cited

U.S. PATENT DOCUMENTS

| | | | | |
|---|---|---|---|---|
| 4,222,601 A | * | 9/1980 | White et al. ................. | 160/306 |
| 4,971,378 A | * | 11/1990 | Setina ...................... | 296/24.46 |
| 5,427,466 A | * | 6/1995 | Kennedy .................... | 403/117 |
| 5,437,324 A | * | 8/1995 | Sternquist ................... | 160/299 |
| 5,551,726 A | * | 9/1996 | Ament ...................... | 296/24.43 |
| 5,695,217 A | * | 12/1997 | Ament et al. ................ | 280/749 |
| 5,697,663 A | * | 12/1997 | Chenowth ................... | 296/98 |
| 5,711,568 A | * | 1/1998 | Diem et al. ................ | 296/37.16 |
| 5,975,599 A | * | 11/1999 | Goldstein ................... | 293/128 |
| 6,125,908 A | * | 10/2000 | Ament et al. ............. | 296/37.16 |
| 6,183,028 B1 | * | 2/2001 | Ament et al. ............. | 296/24.43 |
| 6,279,639 B1 | * | 8/2001 | Schlecht et al. ........... | 160/23.1 |
| 6,390,526 B1 | * | 5/2002 | Ament et al. ............. | 296/24.43 |
| 6,595,567 B1 | * | 7/2003 | Ament et al. ............. | 296/24.43 |
| 6,598,651 B2 | * | 7/2003 | Ehrenberger et al. ....... | 160/238 |
| 6,598,921 B2 | * | 7/2003 | Seel et al. ................ | 296/24.43 |
| 2002/0096900 A1 | * | 7/2002 | Moore ........................ | 296/24.1 |
| 2004/0130171 A1 | * | 7/2004 | Zummack ................... | 296/24.4 |

FOREIGN PATENT DOCUMENTS

| | | |
|---|---|---|
| DE | 40 10 209 | 10/1991 |
| DE | 40 10 209 | 3/1994 |
| DE | 43 36 380 | 4/1995 |
| DE | 197 28 587 | 11/1998 |
| EP | 0 649 778 | 4/1995 |

* cited by examiner

Primary Examiner—Kiran Patel
(74) Attorney, Agent, or Firm—Herbert Dubno

(57) ABSTRACT

A holding bar of a safety net separating a luggage compartment from a passenger compartment of an automobile vehicle has a tubular body from which holding members project at its end to engage in brackets close to the roof of the vehicle. Within the tube, the holders have enlarged ends which apply compression force to respective deformation bodies braced against constrictions of the tube so that the kinetic energy of a crash is converted to axial decompression deformation of those bodies. The bodies may be injection molded onto the shanks or can be formed of a plurality of parts and clipped together therearound.

17 Claims, 6 Drawing Sheets

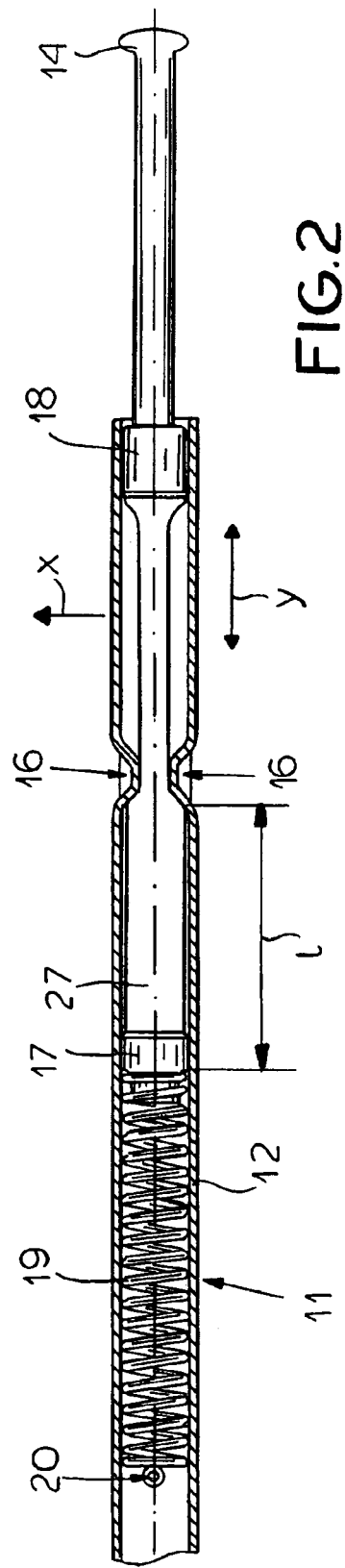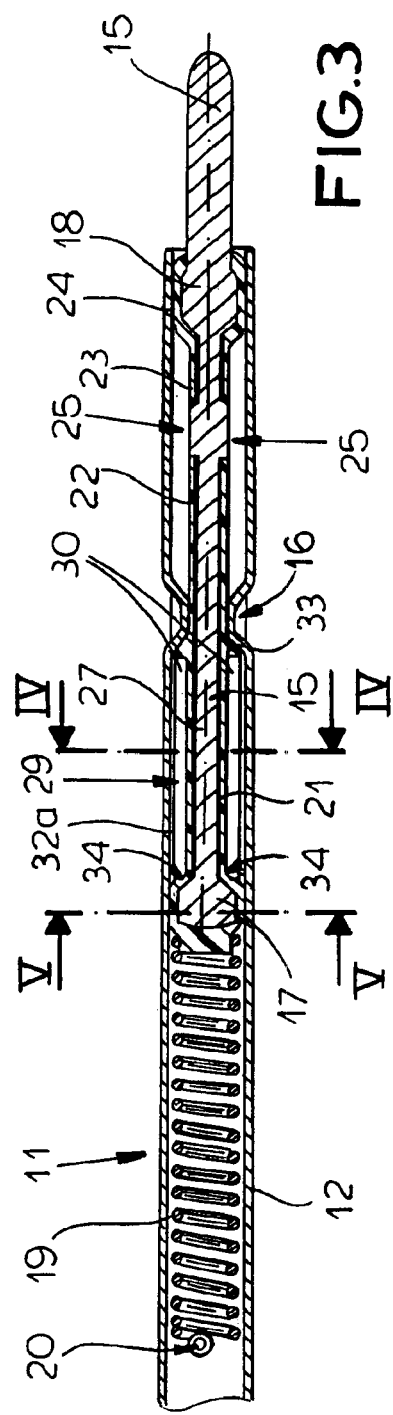

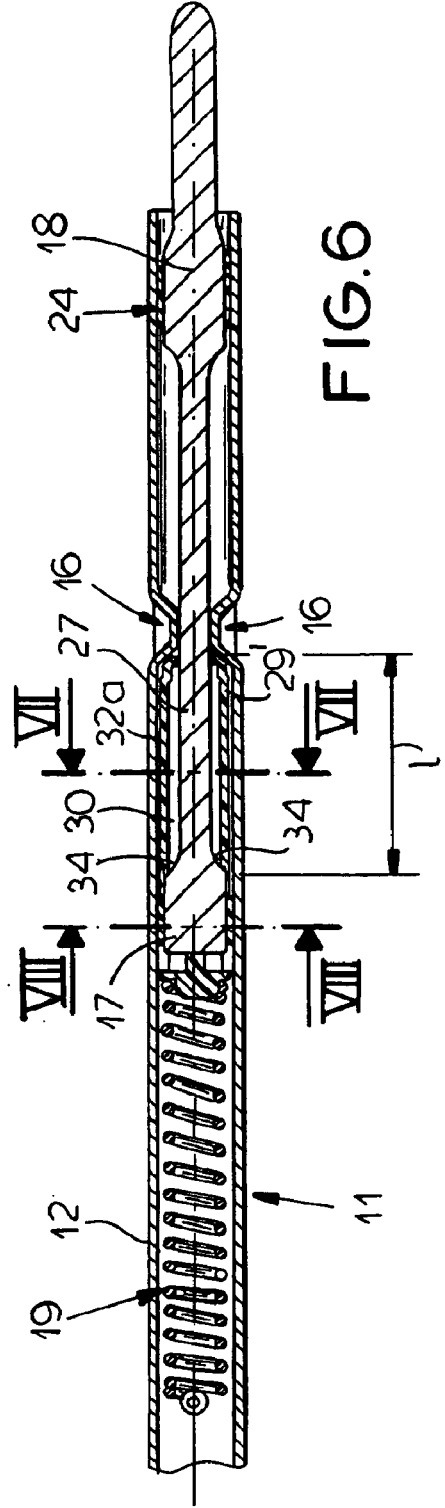
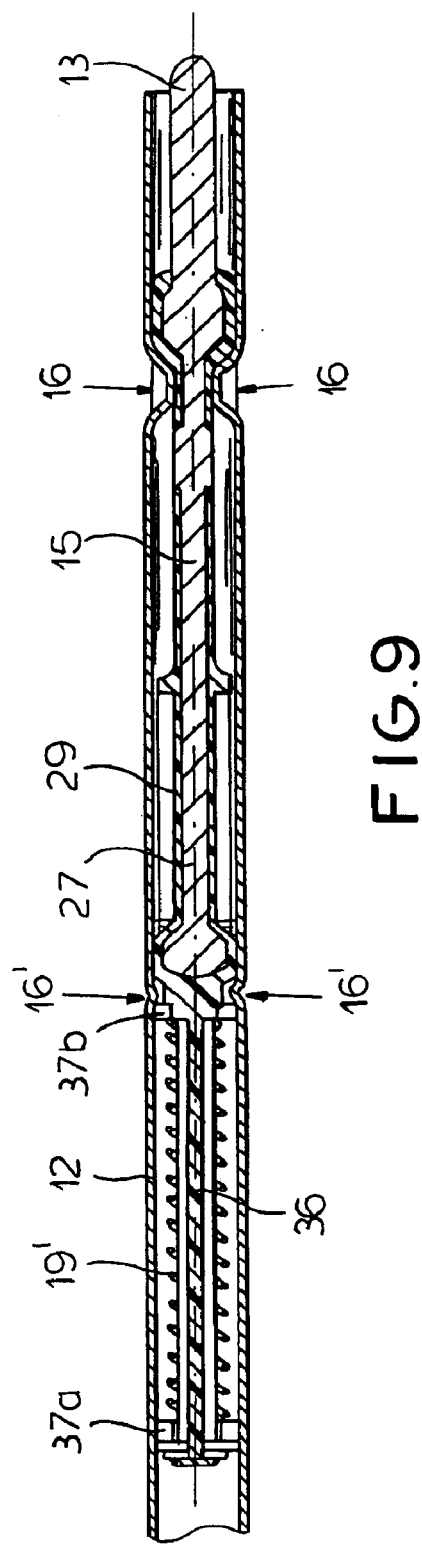

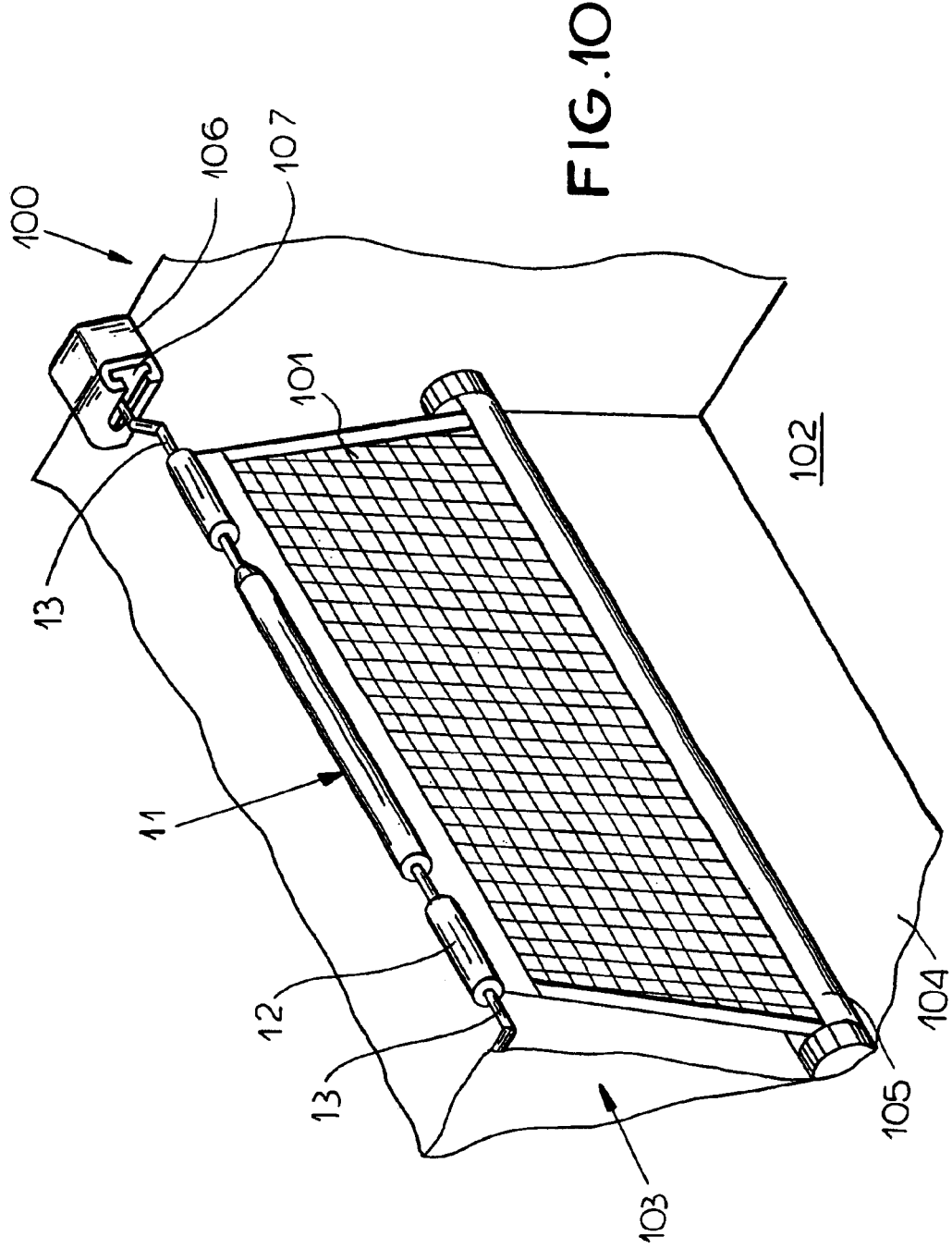

AUTOMOBILE SAFETY ACCESSORY, ESPECIALLY A SEPARATING NET

FIELD OF THE INVENTION

The present invention relates to an automobile accessory in the form of a separating or safety net adapted to be disposed in a vehicle between a cargo compartment and a passenger compartment and intended to prevent the passage of articles from the cargo space into the passenger or driver space (passenger compartment). More particularly, the invention relates to a separating net of this type with crash protection.

BACKGROUND OF THE INVENTION

It is known to provide a separating net between a cargo or storage space in an automotive vehicle and a passenger or driver's compartment. Such systems usually wind up the web-shaped member, usually a mesh or net, on a lower rod which can be received in a housing. The upper edge of the net is provided with an upper holding rod which can be engaged in brackets or holders at the roof of the vehicle so that the net can be pulled out of the housing and unrolled from the lower rod like a window shade.

The lower rod is a winding shaft onto which the web is wound and may be under spring action to automatically wind up the net and store a winding force when the net is withdrawn. The net can be received in the housing in some other compressed form as well.

Generally the net bridges the opening which may remain between the upper part of the vehicle back rests or between some other seating part of the vehicle and the vehicle roof.

It should be noted that the invention here relates not only to automotive vehicle nets of the type described but also to covers for the storage compartment of a vehicle and indeed wherever a rod or bar is connected to a web in a vehicle and is releasably anchored in brackets on opposite sides of the vehicle.

As has been indicated, the separating net for a motor vehicle serves primarily in the case of sharp deceleration of the vehicle, especially a rapid stopping in the case of a crash, to prevent objects in the storage compartment of the vehicle from flying into the passenger compartment. The upper rod is in that case inserted into the brackets on opposite sides of the vehicle adjacent the roof. For that purpose, the rod has fastening elements at its ends, especially mushroom-shaped or other enlargements, for engagement in receiving grooves of the brackets.

In case of a crash the forces which are produced are numerous and it is therefore important that the holding rod not be sharply bent or broken if the separating net is to retain its safety function. It is also important that the entire energy which may be applied to the rod in the case of a crash not be transmitted to the brackets. A variety of tests have been made heretofore in order to develop a satisfactory energy-absorbing system for a separating net. However, there is a significant problem in that the rod itself is usually a tubular hollow body in which the fastening elements at the ends may be axially shiftable and thus has little available space in which energy absorbing elements can be arranged.

In German Patent Document DE 40 10 209 A1 for example, an energy absorbing system has been proposed for a holding rod for a separating net which utilizes a constriction in the tubular body and an inwardly widening conical end piece which deforms corrugation-like indentations of the tube in the case of a crash. Difficulties have been encountered with this system as to the fabrication and mounting tolerances of the corrugation-like indentations since the exact deformation forces and their transmission depend directly upon such tolerances.

Another problem is the drawback of deforming the holding tube of the rod itself, i.e. the tubular body, since that introduces the danger of excessive stressing of the tube which can result in breakage of the tube in the case of a crash because of the weakening of the tube by reduction of its bending or bucket resistance.

These problems have been recognized in European Patent Document EP 0 649 778 B1 which proposes an improvement in the energy dissipating arrangement by providing a separate deformation body which is either a component of an insert or a separate cylindrical tube according to the embodiment of FIGS. 8 and 9 of this patent document. The holder has here on its inner end two diametrically opposite radial projections which result from indentation of the shaft. The part projecting over the outer surface of the shaft has a generally semicircular shape. The two radial projections form an abutment body which prevents the holder elements from falling out of the rod. In the case of a crash the radial projections increasingly are forced through the deformation body and deform the latter. The deformation body is braced in the system of this patent document against a separate element in the form of a steel ring. The deformation of the deformation body is in the nature of an embedding of the radial projections in the interior of that body.

OBJECTS OF THE INVENTION

It is the principal object of the present invention to provide an energy absorbing system for the holding rod of a separating net or like system as has been described which affords better energy absorption with a simpler construction than the prior art systems.

Another object is to provide a passenger vehicle accessory with a holding rod and web which has the advantageous properties of the systems described but without drawbacks thereof and especially is less dependent upon manufacturing and assembly tolerances.

SUMMARY OF THE INVENTION

These objects and others which will become apparent hereinafter are attained, in accordance with the invention in a passenger vehicle accessory comprising a web adapted to be drawn across a portion of a vehicle and having an elongated withdrawing element attached to that web and adapted be retained in the vehicle, that element comprising:

a tube extending over at least a portion of a length of the element and formed with at least one constriction;

a carrier having an elongated first portion in the tube and a second portion extending out of the tube and provided at an end with a formation engageable with the vehicle so as to be retained thereby, the first portion having a thickened end with a cross section substantially greater than a cross section of a shank of the first portion adjacent the thickened end; and a deformation body of deformable material on the carrier, fixed on the thickened end and positioned so that the constriction forms directly or indirectly a stop for the deformation body, the thickened end having surfaces exerting thrust on the deformation body in the direction of the constriction whereby, upon high loading of the element in case of a crash, the surfaces cause compressive deformation of the body enabling the body to take up kinetic energy of loading of the element.

The invention thus achieves the objects set forth by providing a carrier with a thickened end which has a cross section substantially greater than a second cross sectional area of an axial segment of the carrier adjustment this end and whereby the constriction in the tube surrounding the area forms a stop or abutment directly or indirectly for the deformation body surrounding this axial section of the carrier so that the thick end has a compression surface adapted to apply a compressive deformation in the axial direction to the deformation body. It is therefore essential to the invention that in the case of a crash the deformation body is at least partially deformed by axial compression between the thick end of the carrier and the constriction (in addition to any shear forces which may be applied).

It is therefore an important feature of the invention that the carrier has a thick end which bears against the deformation body for compressive deformation and that the thick end have a cross sectional area which is much greater than the cross sectional area of the axial segment of the carrier around which the deformation body is provided. The enlargement of the thick end can impart a T-shape configuration to the carrier at the free end thereof within the tube. Because of this enlargement, the corresponding end of the deformation body can be securely engaged axially to ensure that a compressive deformation will be imparted to the deformation body which is also deformed in the shear direction.

While the prior systems described had relatively small radial projections which were formed by impressing the material of the carrier and which serve to deflect the deformation body radially outwardly and to be embedded therein, and in effect use a cat's claw approach to converting the kinetic energy of a crash into friction energy within the carrier, the approach of the invention is to transform the crash energy into a total axial compressive deformation of the body utilizing the significantly greater area of the thickened end of the carrier as the axially compression member and thus provide an optimal transmission of force to the deformation body and an optimal conversion of the kinetic energy into deformation energy and heat of compression.

The deformation in accordance with the invention utilizes the fact that the deformation body can be considered to be equivalent to a very viscous liquid and the forces applied axially to it can result in complete deformation of the body so that the body itself will flow under the deformation forces. The deformation body can be provided with axial grooves or other spaces into which the solid material of the body can flow upon the axial compression. During the axial compression the shape and the geometric form of the structure body completely changes and the body flows not only where it is engaged by the thickened end of the carrier but is squeezed through the region of the constriction and into the spaces which are left in the body and into weakened zones and/or between ribs of the body. The invention thus allows a greater part of the kinetic energy of a crash as applied to the net holder to be transformed into deformation energy and thus to be absorbed.

At the beginning of a crash, an axial outer end of each deformation body can lie against the respective constriction and can be axially compressed against it and compressed by the constriction against the carrier extending through it. The material of the deformation body is pressed radially outwardly in the region of the constriction and as the deformation body gradually compressed between the thickened end and the constriction, the material of the deformation body flows into any spaces which are left in the deformation body.

The deformation body presses against the carrier and the wall in addition to provide frictional retardation and to convert kinetic energy into frictional heat in addition to the heat of compression. Since the deformation body can be made as long as is desirable, it can be provided to absorb extremely large amounts of kinetic energy. It is important to the invention that the deformation body be held fixed to an axial segment of the carrier and to ensure that the thickened end will bear upon the deformation body with a sufficiently large compression area. As a consequence an increase in the cross sectional area of the control between the deformation body and the carrier is provided toward the thickened end by a progressive increase in the cross sectional area of the carrier or shank toward this end. The deformation body can be directly affixed to this region of the carrier, preferably by injection molding the deformation body therearound.

It is also desirable, in another embodiment, to provide the deformation body in a plurality of parts and to assemble them around the axial segment of the carrier, preferably such that they clip together around one another and are thereby fastened around the carrier.

The deformation body need not in accordance with the invention, bear upon a separate component but can be braced directly upon the inwardly bent corrugations of the tubular body which define the construction. This allows the number of parts to be reduced and permits a simpler and less expensive assembly operation.

The deformation body is so shaped that it is primarily compressed by the carrier against the constriction and such that the material can flow with the constriction holding the end of the deformation body. The constriction is so shaped or formed that, in the region of the constriction, a clearance can be provided between the outer surface of the carrier and the inner surface of the tube. In other words the constriction may leave a clearance into which the deformation body can expand or flow. Since the body is forced between the constriction and the carrier, friction flow in this region is used to dissipate kinetic energy.

According to a feature of the invention, the axial segment with the thickened end is connected in a one piece or shape-locked connection to ensure a stable structure.

It has been noted that the cross section of the carrier widens progressively toward the thickened end in a T-section manner. In this configuration, the compressive surfaces are provided primarily on the two lateral shanks of the cross bar of the T to provide an especially good force distribution. It is also possible to make the axial segment of square cross section and to form the thickened end of elongated rectangular cross section. It has also been found to be possible to make the axial segment of rectangular cross section and the thick end of circular cross section. With these cross sections a restriction of the carrier against rotation within the tubular body can be achieved.

According to a feature of the invention, the deformation body, carrier and tube are so constructed that in the case of a crash the deformation of the deformation body is effected substantially over its entire axial length. This can result in an optimum distribution of forces that the case of the crash since the compression surfaces generate the compression force so that they are distributed over the entire volume of the deformation body. By contrast with the prior systems described, not only does the conical widening of the thick end of the carrier deform the body radially outwardly but a substantial part of the total volume of the deformation body is pressed ahead of the enlarged head of the carrier in an axial direction and is thereby multiply deformed.

It has been mentioned that the deformation body can, in an important feature of the invention, be injection molded around an axial segment of the carrier and around the enlarged end or head thereof. Not only does this simplify construction of the carrier and the deformation body but allows premounting of the deformation body on the carrier and thus simplifies the assembly by enabling the carrier and the deformation body to be mounted as a unit in a tube.

According to another advantageous feature of the invention, the carrier can be provided, by indentation or the like with abutment surfaces which have the advantage that they can be engageable with the corrugations of the constriction in the tubular body and can be located close to an outer side of the carrier. These projections are generally not covered by the injection molded synthetic resin and serve during formation of the corrugations as stops for the indentation thereof to exclude damage to the deformation body. In that case the projections can be located in the region in which the corrugation is to be indented in the tubular body.

When the deformation body is constituted from at least two components, these components can have the configuration of shells which are placed around the carrier and joined by clips or the like. The deformation body can thus be attached to the axial segment before the carrier is inserted in the tube.

Whether the deformation body is formed by clipping a multiplicity of parts together or by injection molding it around the carrier, the handling of the unit formed by assembly of the deformation body and the carrier is simplified. According to a further feature of the invention, the deformation body has at last one rib which extends over a major portion of the length of the carrier or substantially over the entire length of the axial segment with the head of the carrier and the constriction in the tube. The provision of at least one axial rib in this manner ensures a precisely definable deformable volume for the deformation body in the case of a crash.

The rib, of course, guarantees the availability of an expansion space for the material of the deformation body in the case of a crash. The free spaces laterally of the axial rib form expansion compartments which adjoin weakened zones into which the material of the rib and of the adjoining parts of the deformation body can readily flow.

An expansion space can also be provided, in addition or as an alternative, by providing at least one axial groove in the deformation body which can extend over all or part of the axial length of the aforementioned axial segment. That groove provides an expansion space for the purposes described.

It has been found to be advantageous to provide the thickened end or head so that the cross sectional area thereof and the area effective for axial compression of the deformation body is at least 1.3 times the cross sectional area of the axial segment of the steel carrier in the region thereof proximal to the constriction. With this ratio of the cross section of the thickened end or head to that of the axial segment a sufficiently large axial compression surface is provided for the axial deformation of the deformation body. Optimally the head should have twice the cross sectional area of the axial segment. Of course, by altering the ratio between the cross section of the head and the cross sectional area of the axial segment, varying the axial length of the deformation body, providing a greater or lesser number of ribs or grooves and varying the cross sections thereof and altering any of these in combination, the desired transformation of kinetic energy to deformation energy can be controlled.

BRIEF DESCRIPTION OF THE DRAWING

The above and other objects, features, and advantages will become more readily apparent from the following description, reference being made to the accompanying drawing in which:

FIG. 2 is a partial segment through a holding rod provided with the carrier of FIG. 1, turned at 90° to the illustration in FIG. 1 and taken in the direction of the arrow II thereof;

FIG. 3 is a section through a holding rod taken along the line III—III of FIG. 1 and showing the deformation body in section;

FIG. 6 is a view similar to FIG. 3 of a second embodiment of the invention;

FIG. 9 is a cross sectional view similar to that of FIGS. 3 and 6 showing a similar embodiment; and FIG. 10 is a perspective view of a separating net for a motor vehicle, shown fragmentarily, in accordance with the invention.

SPECIFIC DESCRIPTION

Figure 1:
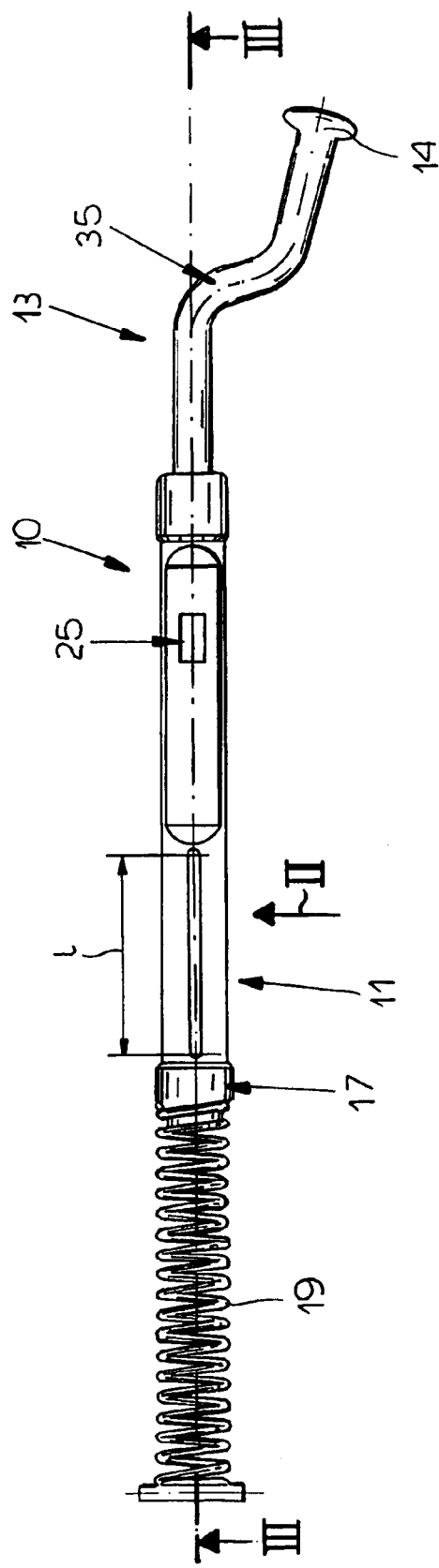
FIG. 1 is an elevational view of a carrier and its spring for a holding rod for a separating net for a motor vehicle according to the invention.

Referring first to FIG. 10, in which a portion of an automobile 100 has been shown, it can be seen that a separating net 101 can be provided between a luggage compartment or storage space or like region 102 and a passenger compartment 103 ahead of the vehicle seats 104 upon being withdrawn from a housing 105 in which the net is wound up on a winding bar under the action of a spring. Proximal to the roof of the vehicle, brackets 106 are provided in which the ends of a holding bar or rod 11, serving as the element for withdrawing the net from the housing 105, can be engaged. The details of the holding bar 11 can be deduced from FIGS. 1–9 and details of the net, holder and bracket constructions can be drawn from FIG. 1 of EP 0 649 778. As a general matter the net is held by the winding bar in the housing which is mounted at the backrest of the seats of the passenger compartment.

The holding bar 11 comprises, as shown in FIG. 3, a tubular body 12 which has been illustrated in section and from which a pair of carriers 13 extend. The carriers are axially displaceable within the body 12 and have heads at their ends which engage in keyhole slots 107 of the brackets 106. In FIGS. 1–3 and 6 it is assumed that the viewer is looking at one end of the holding bar 11. The direction of vehicle travel is seen at x in FIG. 2 and the axial shiftability of each holder 13 is in the direction of the double headed arrow y, transverse to the travel direction x of the vehicle.

In FIG. 1 from which the tube 12 has been omitted, the holder 13 is seen to be elongated in the axial direction and is provided at its inner end 17 with an enlargement as will be described in greater detail and at its opposite end with the mushroom-shaped head 14. The mushroom head 14 is engageable in the respective receiving groove of the bracket which is normally mounted in the region of the C-column or roof of the automotive vehicle. The form of the fastened element 14 can be selected freely with respect to its geometry. To allow the fastening element 14 to be engaged in the fastening opening or slot on the vehicle and to compensate for tolerances in vehicle construction and interior work, each holder 13 is axially shiftable within the tube 12 against the force of a spring, for example the spring 19 which is braced against a pin 20 traversing the tube 12. To prevent the holder 13 from being fully withdrawn form the tube 12, and to provide a seat for the deformation body to be described, the tube 12 is formed with corrugation-like indentations 16 after the holder has been inserted sufficiently into the tube so that the head or thickened end 17 of the carrier 13 cannot be withdrawn from the tube. The shank 15 of the holder 13 is surrounded by the deformation body 29 which will be described in greater detail hereinafter. As a consequence, the inner thickened end 17 of the carrier 13 on the inner end of the shank 15 is located inwardly of the constriction 16 so that the constriction 16 provides a shape lock against extraction of the holder 13.

In the embodiment illustrated in FIGS. 1–3, the shank 15 is formed in one piece with the fastening element 14 although this is not absolutely necessary. In the embodiment illustrated the shank 15 is a one piece massive structure of steel. It has a first thickening or head 17 (inner thickened end 17) and an outer thickening 18 (outer end 18) and the constriction 16 lies between the two thickened portions 17 and 18.

The inward movement of the shank 15 in the tube 12 is limited by a bent region 35 at the mouth of the tube 12. The inward movement can also be limited by abutment of the thickening 18 against the constriction 16. An extraction of the carrier 13 under normal loads, not in the case of a crash, would involve an abutment of a conical region 33 of the deformation body 29 against the constriction 16 to limit that displacement.

As noted, the compression spring 19 is braced between the inner end 17 of the shank 15 and the stop 20 which has been shown as a splint directly fixed in the tube 12.

The deformation body 29 is formed by injection molding a synthetic resin around the shank 15 over a first axial segment 27 thereof. This portion of the injection molded synthetic resin has been designated at 21.

The injection molded synthetic resin extends from the first portion 21 to a second injection molded portion 22 which has a substantially smaller diameter and does not form part of the deformation body. After an interruption, a third portion 23 of the injection molded material surrounds the shank 15 in the region of its outer end 18 to define a sleeve-like jacket 24 thereof. The injection molded material in general is a polyamide, preferably a short fiber reinforced polyamide and most advantageously a glass fiber reinforced polyamide synthetic resin.

The shank 15 is coated entirely with the injection molded synthetic resin in its region within the tube 12 (see FIG. 3) except for the lateral projections 24 formed by impressing the shank and forming an abutment. These projections 25 can be located directly in line with the corrugations 16 when they are impressed in the tube so that these corrugations will bear against the projections 25 and thus be precisely positioned at the appropriate clearance from the balance of the shank. The projections 25 thus form stops for the inward deformation of the tube during the formation of the constriction and no other means is required to control the depth of penetration of the corrugations. The stops 25 define the finishing tolerance and thereby simplify assembly.

The shank 15 is therefore slightly thicker in the region 25 than in the neighboring regions and may be coated with the synthetic resin in the coating portions 21, 22 and 23 to a thickness equal to the extent to which the projections 25 extend from the shank. The synthetic resin is bonded by injection molding to the shank in the regions 21, 22 and 23.

Figure 4:
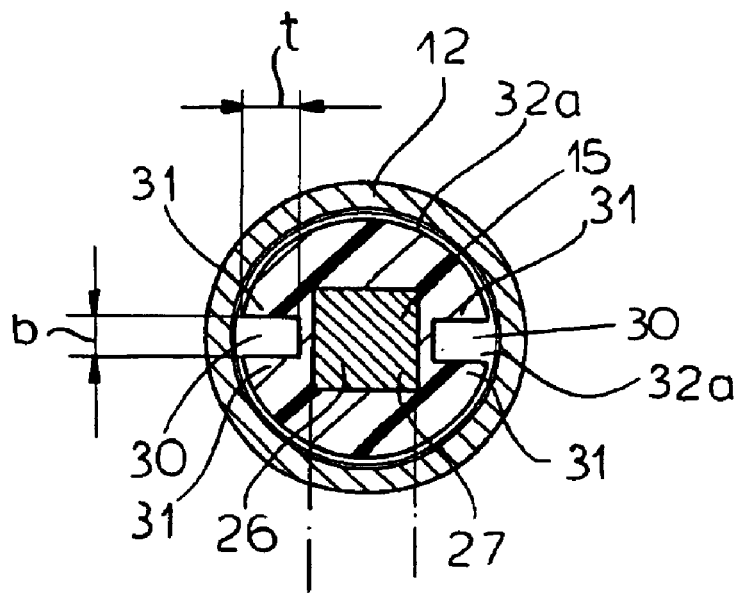
FIG. 4 is a cross sectional view taken along the line IV—IV of FIG. 3.

From FIG. 4 it will be apparent that the deformation body 29 extends outwardly from the shank and can have a cross section corresponding to that of FIG. 4. The shank 15 can be seen to have a square cross section in the region of the axial segment 27 and is completely enveloped in the synthetic resin material of the deformation body 29. The latter is, however formed with two axial grooves 30 which are set radially inwardly and define expansion spaces 32b in a kind of weakened zone for the synthetic resin mass of the deformation body. By the provision of the axial grooves at the edge regions of the grooves corresponding rib-like projections 31 are formed.

Between the outer surface of the deformation body 29 and the inner surface of the tube 12 a further radial expansion compartment 32a is formed as can be seen in FIG. 4.

Figure 5:
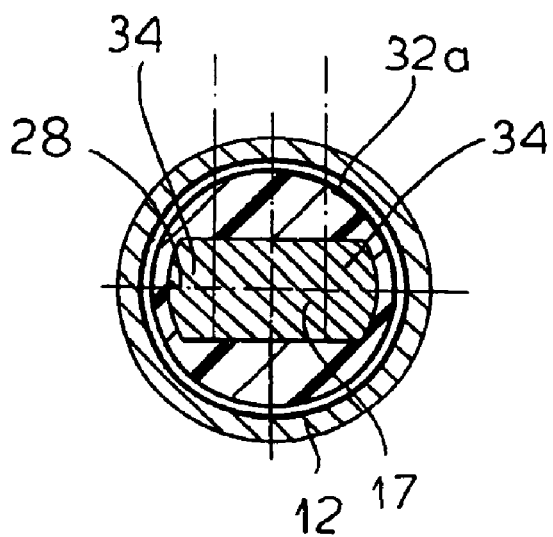
FIG. 5 is a section taken along the line V—V of FIG. 3.

FIG. 5 shows a cross section through the inner thickened end or head 17 of the shank 15. By contrast with FIG. 4, the cross sectional area 28 of the head 17 is significantly larger than the cross sectional area 26 in the region of the axial segment 27. The head thus forms a significant cross sectional enlargement and not merely a bump in the envelope curve of the axial segment so that rather than driving into the material of the deformation body, the head forms a significant compression surface 34 whose function will be developed below.

In the case of a crash, the deformation body lies initially in contact with the conical segment 33 formed by injection molding against the constriction 16. If the shank 25 is drawn to the right as a result of the crash, i.e. is pulled out of the tube 12 by the significant forces resulting from a crash, the deformation body 29 is axially compressed by the surfaces 34 against the constriction 16. The material of the deformation body is forced into the expansion chambers 32a and 32b. The material which is so forced to flow can initially be the ribs 31. The flow of the material to the right in FIG. 3 into the space around the head 17, through any clearance in the constriction and into the expansion chambers results in the dissipation of the crash energy as heat of compression and requires increasing axial force as the compression continues.

Because of the provision of weakened zones within the deformation body 29, i.e. the provision of expansion spaces 32b, the flow of the plastic material of the deformation body takes place in the axial and radial directions to form a more compact mass. When the axial grooves have predetermined widths b and depths t, i.e. precise dimensions of the expansion spaces 32b, a highly precisely determinable deformation of the body 29 occurs. The ribs 31 can also be configured to ensure a precisely desired deformation characteristic.

By the provision of a predetermined axial length l of the axial segment 27 and thus predetermined lengths of the ribs 31 and grooves, a desired force distribution during deformation of the body 29 can be ensured and the maximum kinetic energy which is absorbed in this manner can be determined. The formation of the body 29 as an injection molded sheath around the shank 15 is not only inexpensive but it permits good tolerances to be maintained to again ensure, in connection with the small tolerances with respect to the dimensions of the axial compression surfaces 34, a well defined dissipation of energy in the deformation body and low tolerances in mounting the holder assembly 13 in the tube and in the formation of the constriction 16.

Because the deformation body 29 and the shank for holder 15 form a unit because the deformation body is fixed on the shank 15 before it is inserted into the tube, the assembly is facilitated while tolerances are maintained and there need not be any concern after assembly for adjusting the tolerances.

Figure 7:
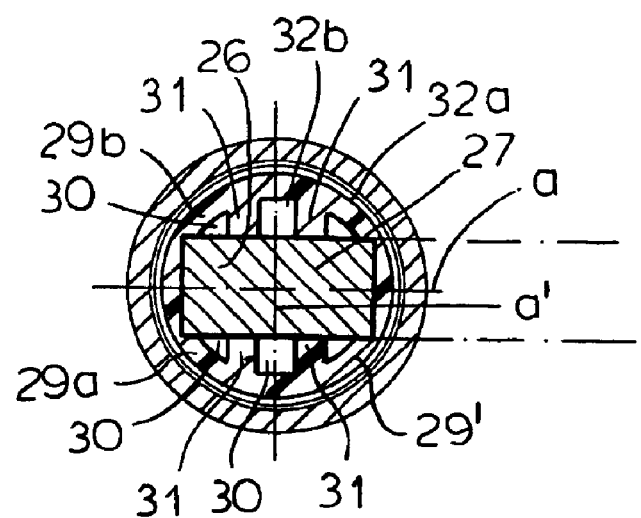
FIG. 7 is a cross sectional view along the line VII—VII of FIG. 6.
Figure 8:
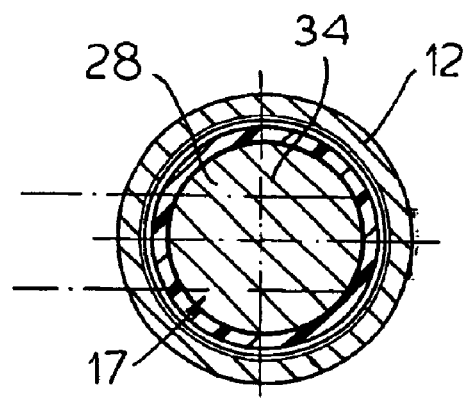
FIG. 8 is a cross sectional view along the line VIII—VIII of FIG. 6.

FIGS. 6–8 show another embodiment in which the deformation body 29 is a two part structure in which the two half shells 29' (FIG. 7) which may be injection molded from the plastic are clipped together around the head 17 and shank 27 of the holder. The geometric configuration of the deformation body 29' in this embodiment, composed of two half shells 29a and 29b, is slightly different. In this embodiment axially directed ribs 31 and corresponding grooves 30 are provided which extend over the entire axial length l of the axial segment 7.

The axial segment here has a rectangular cross section 26 (FIG. 7) while the head 17 has a circular cross section 28 (FIG. 8). The axial compression surfaces 34 are significantly larger in area in the cross sectional area 26 of the shank. FIG. 9 shows schematically a third embodiment in which the deformation body 29 is similar to that provided in FIGS. 1–3 although the spring element 19' is somewhat different. In the embodiment of FIG. 9 the shank 15 is somewhat longer than that of FIGS. 1–3 and extends into a shaft 36. The spring element 19' is disposed between two annular washers 37a and 37b which are traversed by the shaft 36. An additional constriction 16' in the tube forms a stop for the washer 37b and the washer 37a is engaged by the end of the shaft 36 but is free to move within the tube 12. The constriction 16 is only deep enough to enable it to engage the washer 37b and is not as deep as the corrugations for the constriction 16. The spring 19' functions as a compression spring and can be under a prestress.

When the holder 13 is pulled to the right, the spring is compressed against the washer 37b and tends to draw the holder 13 back into the tube. A prestressed spring arrangement has been found to be advantageous whether the prestress is inwardly or outwardly and of course the compression spring can be replaced by a tension spring if desired.

I claim:

1. A passenger vehicle accessory comprising a web adapted to be drawn across a portion of a vehicle and having an elongated withdrawing element adapted to be retained in the vehicle, said element comprising:

a tube extending over at least a portion of a length of said element and formed with at least one constriction;

a carrier having an elongated first portion in said tube and a second portion extending out of said tube and provided at an end with a formation engageable with said vehicle so as to be retained thereby, said first portion having a thickened end with a cross section substantially greater than a cross section of a shank of said first portion adjacent said thickened end; and a deformation body of deformable material on said carrier, fixed on said thickened end and positioned so that said constriction forms directly or indirectly a stop for said deformation body, said thickened end having surfaces exerting thrust on said deformation body in the direction of said constriction whereby, upon high loading of said element in case of a crash, said surfaces cause compressive deformation of said body enabling said body to take up kinetic energy of loading of said element.

2. The passenger vehicle accessory defined in claim 1 wherein said web is a net withdrawn from a housing by a bar connected to a top of said net and formed by said element, said formations being engageable in brackets in said vehicle, thereby forming a safety device in said vehicle between a cargo compartment and a passenger compartment.

3. The safety device defined in claim 2 wherein said thickened end is formed in one piece with said shank.

4. The safety device defined in claim 2 wherein the cross section of said carrier at said thickened end is substantially T-shaped.

5. The safety device defined in claim 2 wherein, in case of a crash, said deformation body is subjected to compression and deformation over substantially an entire axial length of said deformation body.

6. The safety device defined in claim 2 wherein said deformation body is formed on said shank and said thickened end by injection molding of a synthetic resin therearound.

7. The safety device defined in claim 2 wherein said deformation body is formed from at least two parts connected together around said shank and said thickened end.

8. The safety device defined in claim 7 wherein said parts are substantially shell shaped and are directly fastened together around said shank and said thickened end.

9. The safety device defined in claim 8 wherein said parts are clipped together.

10. The safety device defined in claim 2 wherein said shank is impressed to form a pair of projections enabling said tube to be compressed thereagainst to form said constriction.

11. The safety device defined in claim 2 wherein said carrier is formed from steel and said deformation body is formed from a synthetic resin.

12. The safety device defined in claim 2 wherein said deformation body is formed with at least one expansion space into which material of said deformation body flows upon axial compression of said body.

13. The safety device defined in claim 12 wherein a first expansion space is formed between an outer surface of said deformation body and an inner surface of said tube.

14. The safety device defined in claim 13 wherein a second expansion space is formed by at least one axial groove provided in said deformation body.

15. The safety device defined in claim 2 wherein said deformation body is provided with at least one rib extending axially on said body substantially an entire length of said shank of said first portion between said thickened end and said constriction.

16. The safety device defined in claim 2 wherein said thickened end has a cross sectional area at least 1.3 times a cross sectional area of said shank.

17. The safety device defined in claim 16 wherein said cross sectional area of said thickened end is about two times the cross sectional area of said shank.

* * * * *